(No Model.)
J. M. HILLER.
ROAD CART.
No. 288,336. Patented Nov. 13, 1883.
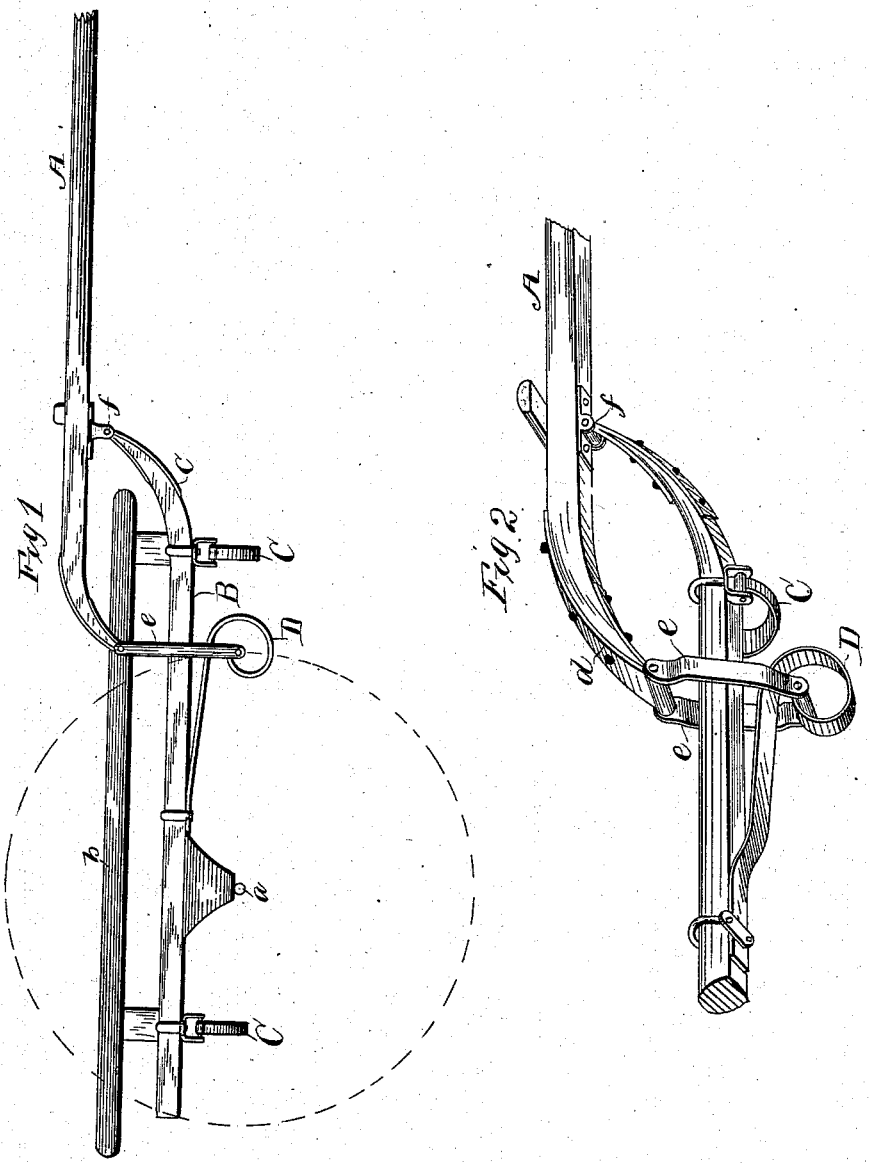
WITNESSES
W. E. Bowen.
Chas. R. Burr.
INVENTOR
John M. Hiller.
By Myers & Co.
Attorneys.

UNITED STATES PATENT OFFICE.

JOHN M. HILLER, OF EARLVILLE, ILLINOIS.

ROAD-CART.

SPECIFICATION forming part of Letters Patent No. 288,336, dated November 13, 1883.

Application filed August 14, 1883. (No model.)

*To all whom it may concern:*

Be it known that I, JOHN M. HILLER, a citizen of the United States of America, residing at Earlville, in the county of La Salle and State of Illinois, have invented certain new and useful Improvements in Road-Carts, of which the following is a specification, reference being had therein to the accompanying drawings.

This invention has relation to improvements in two-wheeled vehicles, having for its object to prevent the transmission of the jerking or vibratory motion of the shafts to the box or body and to allow the ready balancing of the body or box; and it consists of the connection of the shafts to separate bars with upturned forward ends and clipped to the axle, and which serve as extensions of the shafts, said connection being effected by articulating or shackling the shafts, near their rear ends, to the forward upturned ends of said bars, and looping or clipping their extreme rear ends to coiled or helical springs secured to the under side of the said bars, substantially as hereinafter more fully set forth and claimed.

In the accompanying drawings, Figure 1 is a side view of my improved two-wheeled vehicle. Fig. 2 is an enlarged detail view, embodying the points of connection between the shafts and their separate extension-bars.

In carrying out my invention I employ, in connection with shafts A A, separate bars B, which serve as extensions of the shafts for connecting them to the vehicle-axle $a$. These bars are connected to the upper side of the axle $a$ in the usual manner, as shown, and to the said bars is connected the body or box, only the bottom of which is represented, the same being designated by the letter $b$. The connection between these latter-named parts is effected by mounting the body or box upon cross-springs C, near its ends, and clipping the ends of said springs to the shaft-extension bars B in the ordinary manner, and so as to allow the body to be moved relatively to the axle in balancing it. The forward ends of the shaft-extension bars B are curved or extended upward, as at $c$, the function of which will presently be seen. The extreme rear ends of the shafts are curved or bent downward, as at $d$, and connected by parallel plates $e$ $e$, embracing said extensions, to coiled or helical springs D, fastened at their rear ends to the under side of the said bars, the bolts connecting the lower ends of the parallel plates together being passed through eyes formed upon the ends of coiled portions of the springs. The shafts, near their rear ends, are articulated or shackled to the upturned forward ends of the extension-bars B, as at $f$, which, together with the spring-connection above described, forms a compound flexible connection between the shafts and said bars, whereby the transmission to the body or box of the jerking or vibratory motion imparted by the horse to the shafts will be prevented, since the vibrations of the shafts are compensated by the shackle and spring connections, while the body or box is permitted to have a gentle or moderate oscillation, just sufficient to render it comfortable or easy riding.

Having thus fully described my invention, I claim and desire to secure by Letters Patent—

1. In a two-wheeled vehicle, the combination, with the shafts having rear downward extended ends, of the shaft bars or extensions with upturned forward ends, the springs connected to the extreme rear ends of the shafts and to the under side of the shaft-bars, and the shackles connecting the shafts, near their rear ends, to the forward upturned ends of the said bars, substantially as and for the purpose set forth.

2. In a two-wheeled vehicle, the combination, with the shafts with rear downward curved ends, of the shaft bars or extensions with upturned forward ends, the parallel plates connected to the rear ends of the shafts, the helical springs with their coiled ends secured to said plates, their opposite ends connected to the under side of the shafts, and the shackles connecting the shafts, near their rear ends, to the upturned forward ends of the shaft extensions or bars, substantially as and for the purpose set forth.

In testimony whereof I affix my signature in presence of two witnesses.

JOHN M. HILLER.

Witnesses:
JAMES S. RADLEY,
JAMES H. D'LAMATTER.